United States Patent
Ramnani et al.

(10) Patent No.: US 11,823,592 B2
(45) Date of Patent: Nov. 21, 2023

(54) VIRTUAL AGENT CONDUCTING INTERACTIVE TESTING

(71) Applicant: Accenture Global Solutions Limited, Dublin (IE)

(72) Inventors: Roshni Ramesh Ramnani, Bangalore (IN); Shubhashis Sengupta, Bangalore (IN); Saurabh Agrawal, Jaipur (IN)

(73) Assignee: Accenture Global Solutions Limited, Dublin (IE)

( * ) Notice: Subject to any disclaimer, the term of this patent is extended or adjusted under 35 U.S.C. 154(b) by 81 days.

(21) Appl. No.: 17/462,476

(22) Filed: Aug. 31, 2021

(65) Prior Publication Data

US 2023/0068338 A1    Mar. 2, 2023

(51) Int. Cl.
G09B 7/06      (2006.01)
G06F 3/16      (2006.01)
G06F 40/289    (2020.01)
G06F 40/216    (2020.01)

(52) U.S. Cl.
CPC .............. *G09B 7/06* (2013.01); *G06F 3/167* (2013.01); *G06F 40/216* (2020.01); *G06F 40/289* (2020.01)

(58) Field of Classification Search
CPC ........ G09B 7/06; G06F 40/216; G06F 40/289
See application file for complete search history.

(56) References Cited

U.S. PATENT DOCUMENTS

| 2009/0061399 A1* | 3/2009 | Freeman ............... G09B 19/00 434/157 |
| 2011/0123967 A1* | 5/2011 | Perronnin ............. G09B 7/02 434/362 |
| 2013/0224718 A1* | 8/2013 | Woodward ........... G09B 7/00 434/350 |

(Continued)

OTHER PUBLICATIONS

Gao et al., "Generating Distractors for Reading Comprehension Questions from Real Examinations", 2019, AAAI, Proceedings of the AAAI Conference on Artificial Intelligence, 33(01), 6423-6430, https://doi.org/10.1609/aaai.v33i01.33016423 (Year: 2019).*

(Continued)

*Primary Examiner* — Robert J Utama
*Assistant Examiner* — Correll T French
(74) *Attorney, Agent, or Firm* — Plumsea Law Group, LLC

(57) ABSTRACT

The disclosed system and method focus on automatically generating questions from input of written text and/or audio transcripts (e.g., learning materials) to aid in teaching people through testing their knowledge about information they have previously been presented with. These questions may be presented to an end user via a conversational system (e.g., virtual agent or chatbot). The user can iterate through each question, provide feedback for the question, attempt to answer the question, and/or get an answer score for each answer. The disclosed system and method can generate questions tailored to a particular subject by using teaching materials as input. The disclosed system and method can further curate the questions based on various conditions to (Continued)

ensure that the questions are automatically selected and arranged in an order that best suits the subject taught and the learner answering the questions.

19 Claims, 4 Drawing Sheets

(56) References Cited

U.S. PATENT DOCUMENTS

| | | | | |
|---|---|---|---|---|
| 2014/0157120 | A1* | 6/2014 | Le Chevalier | G06F 40/106 715/273 |
| 2015/0179082 | A1* | 6/2015 | Byron | G09B 7/00 434/322 |
| 2016/0140210 | A1* | 5/2016 | Pendyala | G06F 40/205 707/737 |
| 2017/0206797 | A1* | 7/2017 | Solomon | G06N 3/006 |
| 2018/0130375 | A1* | 5/2018 | Booth | G09B 5/08 |
| 2018/0253985 | A1* | 9/2018 | Aggarwal | G06N 20/00 |
| 2019/0304321 | A1* | 10/2019 | Kortan | G09B 7/02 |

OTHER PUBLICATIONS

Hazarika, D., Konwar, G., Deb, S., & Bora, D. J. (2020). Sentiment Analysis on Twitter by Using TextBlob for Natural Language Processing. ICRMAT, 24, 63-67, https://annals-csis.org/Volume_24/drp/pdf/20.pdf (Year: 2020).*

Devlin, Jacob et al., "BERT: Pre-training of deep bidrectionaly transformers for language understanding," arXiv:1810.04805v2 ; 2018b.

Halder, Kishaloy et al., "Task-aware representation of sentences for generic text classification," in Proceedings of the 28th International Conference on Computational Linguistics, pp. 3202-3213, Barceloa, Spain (Online), International Committee on Computational Linguistics; 2020.

Joulin, Armand et al., "Bag of tricks for efficient text classification,"; 2016.

Liu, Yinhan et al., "RoBERTa: A Robustly Optimized BERT Pretraining Approach." arXiv preprint arXiv:1907.11692.

Dong, Li et al., "Unified language model pre-training for natural language understanding and generation." arXiv:1905.03197v3.; 2019.

Boudin, Florian, "Unsupervised Keyphrase Extraction with Multipartite graphs", arXiv:1803.08721v2.

Raffel, Colin et al., "Exploring the limits of transfer learning with a unified text-to-text transformer", arXiv:1910.10683v3 ; 2020.

Clark, Christopher et al., "BoolQ: Exploring the Surprising Difficulty of Natural Yes/No Questions", arXiv:1905.10044v1 ; 2019.

Wolf, Thomas et al., "Transformers: State-of-the-art natural language processing", In Proceedings of the 2020 Conference on Empirical methods in Natural Language Processing: System Demonstrations, pp. 38-45, Association for Computational Linguistics ; 2020.

Radford, Alec et al., "Language Models are Unsupervised Multitask Learners," Open AI.

Klein, Guillaume et al., "OpenNMT: Open-Source toolkit for Neural Machine Translation", arXiv preprint arXiv:1701.02810; 2017b.

* cited by examiner

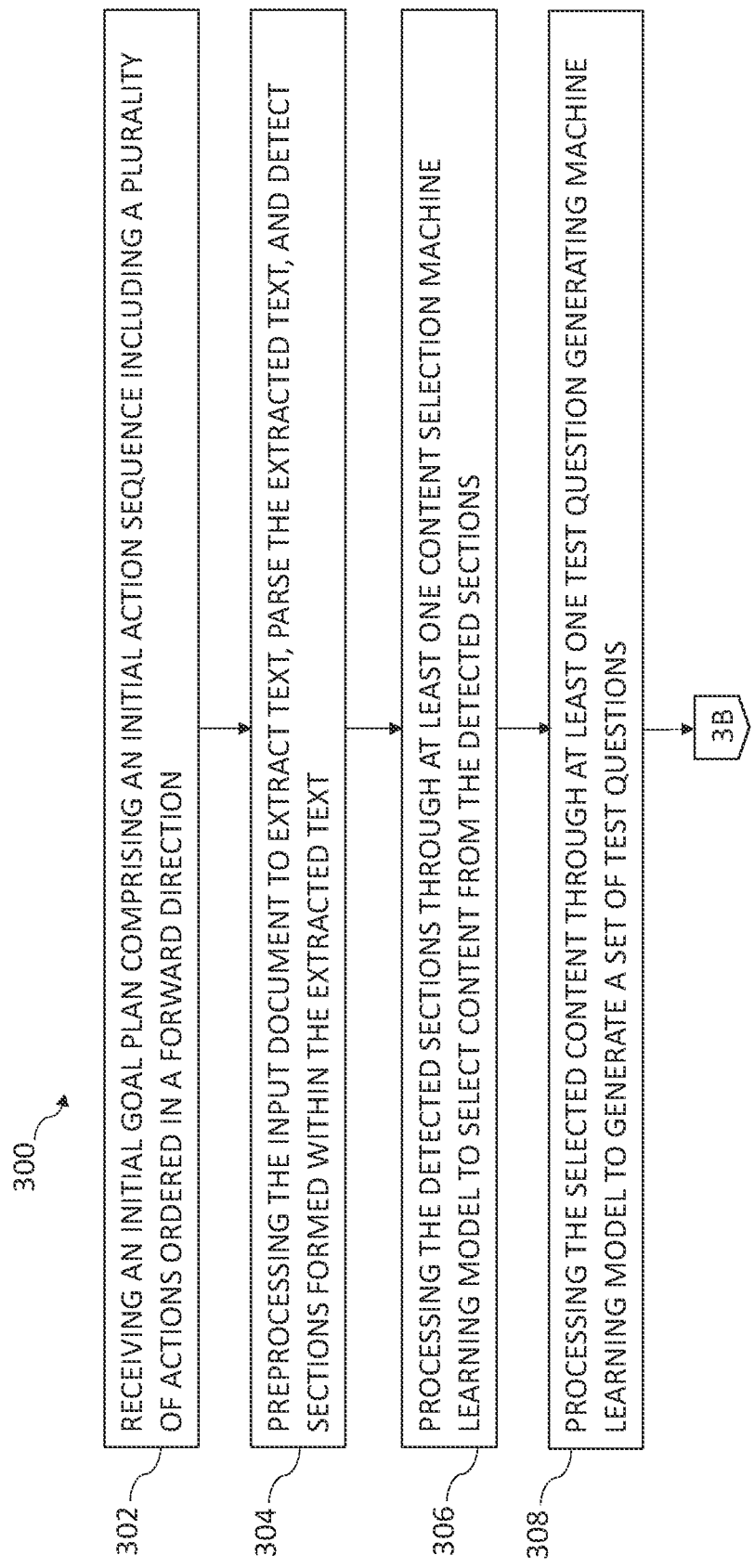

1

VIRTUAL AGENT CONDUCTING INTERACTIVE TESTING

TECHNICAL FIELD

The present disclosure generally relates to a system and method for learning. More specifically, the present disclosure generally relates to machine learning based learning.

BACKGROUND

The fast pace at which new technological innovation is changing job roles and skill requirements is putting increasing pressure on companies to enhance the skills in their employees. Furthermore, companies have changed the way they operate by conducting all their formal training online, including those that were previously only conducted in-person. Companies need an effective mechanism to test and validate the knowledge of their employees and create evaluations with increased rigor and speed. Since there is limited work in this area in the commercial space, assessments are currently being created by knowledge experts who need to read the knowledge material and create questions on them, leading to a huge amount of manual effort. Current computer enabled learning systems lack the ability to converse back and forth with users and to automatically generate questions tailored to specific subjects being taught or to specific users' histories.

There is a need in the art for a system and method that addresses the shortcomings discussed above.

SUMMARY

The disclosed system and method focus on automatically generating questions from input of written text and/or audio transcripts (e.g., learning materials) to aid in teaching people through testing their knowledge about information they have previously been presented with. These questions may be presented to an end user via a conversational system (e.g., virtual agent or chatbot). The user can iterate through each question, provide feedback for the question, attempt to answer the question, and/or get an answer score for each answer.

The disclosed system and method can generate questions tailored to a particular subject and/or specific users' testing histories by using teaching materials as input. The disclosed system and method can further curate the questions based on various conditions to ensure that the questions are automatically selected and arranged in an order that best suits the subject taught and the learner answering the questions. By preprocessing input documents to detect sections, processing the detected sections to select content from the detected sections, and applying machine learning in the disclosed manner, according to various embodiments, the disclosed system and method can generate grammatically correct questions that can be varied within a single topic or subject. Furthermore, the disclosed system and method can calculate an answer score for a test question having a narrative format by processing the user's answer through an answer scoring machine learning model. These answer scores may be used to give feedback to the user and to arrange test questions for the same user (e.g., in a future test session). By processing a test question through a test question scoring machine learning model the system and method can calculate a test question score based on one or more of the user's feedback, a keyphrase score indicating a test question's usefulness, a context score based on the number of keyphrases in the test question that come from the selected content, and the number of distractors corresponding to the test question. These test question scores may be used to arrange test questions.

In one aspect, the disclosure provides a computer implemented method of generating an arrangement of test questions to ask a user during a conversation with a virtual agent. The method may include receiving an input document. The method may include preprocessing the input document to extract text, parse the extracted text, and detect sections formed within the extracted text. The method may include processing the detected sections through at least one content selection machine learning model to select content from the detected sections. The method may include processing the selected content through at least one test question generating machine learning model to generate a set of test questions. The method may include processing the selected content through at least one distractor generating machine learning model to generate at least one set of distractors corresponding to at least one test question of the plurality of test questions. The method may include selecting a plurality of test questions from the set of test questions. The method may include determining an order in which the selected questions are to be presented to the user, wherein the order is based on the user's previous history of answering test questions from the set of test questions. The method may include arranging the selected test questions in the determined order to generate the arrangement of test questions.

In yet another aspect, the disclosure provides a system for generating an arrangement of test questions to ask a user during a conversation with a virtual agent, comprising one or more computers and one or more storage devices storing instructions that are operable, when executed by the one or more computers, to cause the one or more computers to: (1) receive an input document; (2) preprocess the input document to extract text, parse the extracted text, and detect sections formed within the extracted text; (3) process the detected sections through at least one content selection machine learning model to select content from the detected sections; (4) process the selected content through at least one test question generating machine learning model to generate a set of test questions; (5) process the selected content through at least one distractor generating machine learning model to generate at least one set of distractors corresponding to at least one test question of the plurality of test questions; (6) select a plurality of test questions from the set of test questions; (7) determine an order in which the selected questions are to be presented to the user, wherein the order is based on the user's previous history of answering test questions from the set of test questions; and (8) arrange the selected test questions in the determined order to generate the arrangement of test questions In yet another aspect, the disclosure provides a non-transitory computer-readable medium storing software comprising instructions executable by one or more computers which, upon such execution, cause the one or more computers to generate an arrangement of test questions to ask a user during a conversation with a virtual agent by (1) receiving an input document; (2) preprocessing the input document to extract text, parse the extracted text, and detect sections formed within the extracted text; (3) processing the detected sections through at least one content selection machine learning model to select content from the detected sections; (4) processing the selected content through at least one test question generating machine learning model to generate a set of test questions; (5) processing the selected content through at least one distractor generating machine learning model to generate at least one set of distractors corresponding to at least one test question of the plurality of test questions; (6) selecting a plurality of test questions from the set of test questions; (7) determining an order in which the selected questions are to be presented to the user, wherein the order is based on the user's previous history of answering test questions from the set of test questions; and (8) arranging the selected test questions in the determined order to generate the arrangement of test questions.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 3A and 3B shows a method of generating an arrangement of test questions to ask a user during a conversation with a virtual agent, according to an embodiment.

DESCRIPTION OF EMBODIMENTS

The disclosed system and method may generate a set of questions that can be used by a person logged-in with an evaluator role or a learner role. An evaluator is a question creator given the responsibility of creating a question bank on a designed curriculum. A learner is a person who is trying to improve their recall or understanding of the new concepts acquired in a training program. In both cases, the techniques used, and the questions generated may be the same. However, differences may exist in external features of the system. For example, in the evaluator role, the user can see each question in a predefined or default order. This user can also download the question bank as a document. Similarly, in the learner role, the user can be presented with the questions in a shuffled manner, which may consider the user's usage history. When exiting the user may be provided with a summary of his/her performance including total no of questions, number of questions answers correctly, and number of questions skipped.

Figure 1:
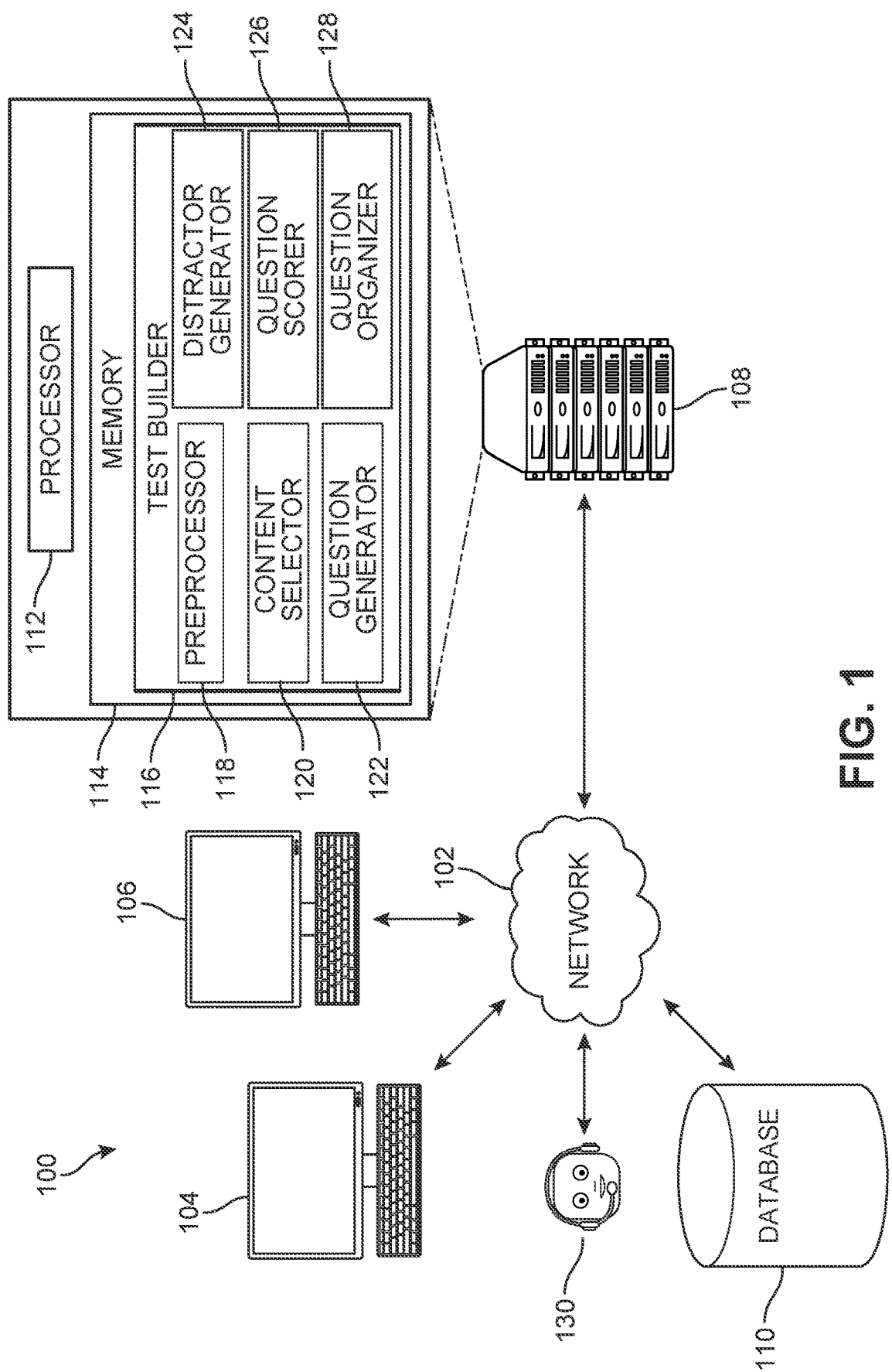
FIG. 1 is a schematic diagram of a system for generating an arrangement of test questions to ask a user during a conversation with a virtual agent, according to an embodiment.

FIG. 1 is a schematic diagram of a system for generating an arrangement of test questions to ask a user during a conversation with a virtual agent 100 (or system 100), according to an embodiment. The disclosed system may include a plurality of components capable of performing the disclosed method of generating an arrangement of test questions to ask a user during a conversation with a virtual agent (e.g., method 200). For example, system 100 includes a first user device 104, a second user device 106, a virtual agent 130, a computing system 108, and a database 110. The components of system 100 can communicate with each other through a network 102. For example, first user device 104 may retrieve information from database 110 via network 102. In some embodiments, network 102 may be a wide area network ("WAN"), e.g., the Internet. In other embodiments, network 102 may be a local area network ("LAN").

As shown in FIG. 1, a test builder 116 may be hosted in computing system 108, which may have a memory 114 and a processor 112. Processor 112 may include a single device processor located on a single device, or it may include multiple device processors located on one or more physical devices. Memory 114 may include any type of storage, which may be physically located on one physical device, or on multiple physical devices. In some cases, computing system 108 may comprise one or more servers that are used to host test builder 116.

While FIG. 1 shows two user devices, it is understood that one or more user devices may be used. For example, in some embodiments, the system may include one or three user devices. The user may include an evaluator reviewing a learner's performance on past tests or modifying the language or arrangement of test questions. The user may additionally or alternatively include a learner interacting with the virtual agent of the system to answer test questions. In some embodiments, the user device may be a computing device used by a user. For example, first user device 104 and/or second user device 106 may include a smartphone or a tablet computer. In other examples, first user device 104 and/or second user device 106 may include a laptop computer, a desktop computer, and/or another type of computing device. The user devices may be used for inputting, processing, and displaying information. Virtual agent 130 may be a chatbot capable of communicating with first user device 104 and/or second user device 106. For example, virtual agent 130 may present test questions to first user device 104 and/or second user device 106. In another example, virtual agent 130 may communicate with first user device 104 and/or second user device 106 to provide feedback to test questions, provide additional information regarding test questions, allow the users to give feedback about the test questions, and/or respond to user utterances.

Database 110 may store data, such as test questions and responses to user utterances for the virtual agent to present to the user. This data may be retrieved by other components for system 100.

Figure 2:
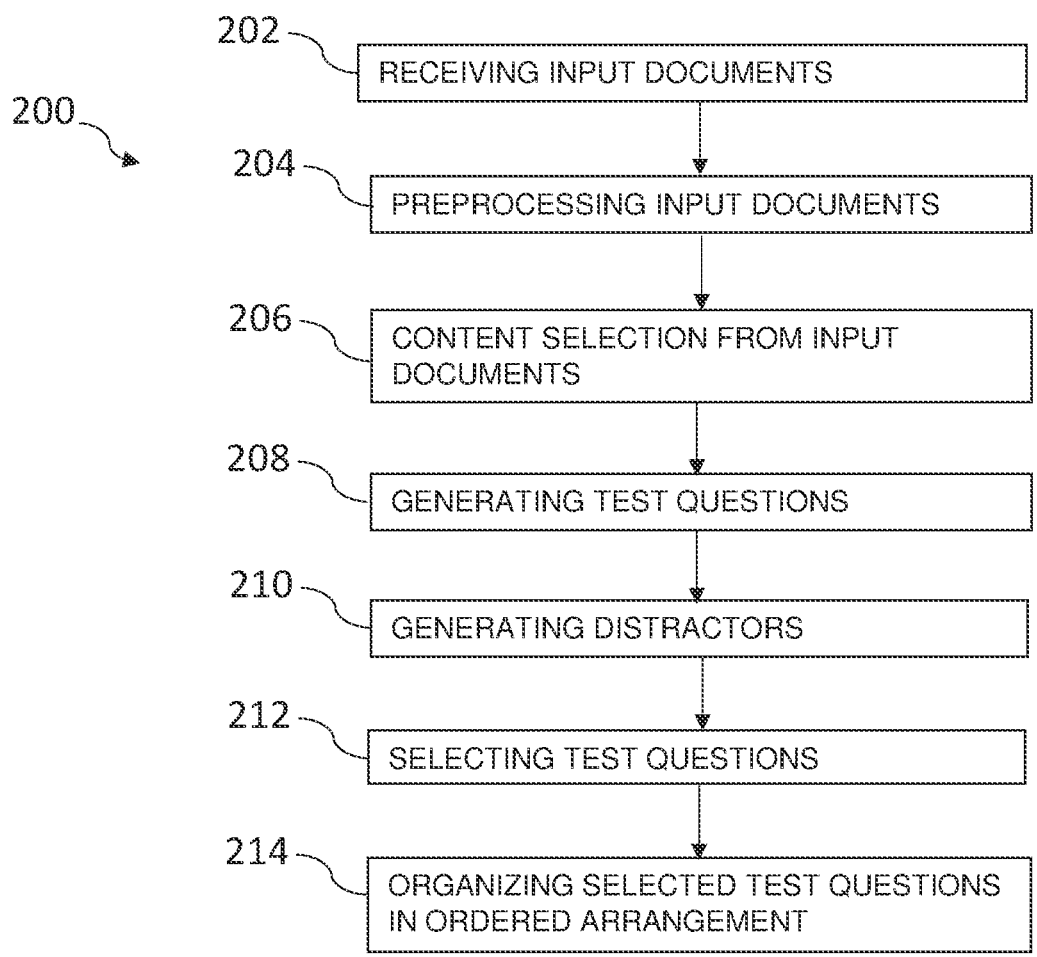
FIG. 2 shows general operations of generating an arrangement of test questions to ask a user during a conversation with a virtual agent, according to an embodiment.

As shown in FIG. 2, the disclosed system and method may include the general operations 200 of receiving input documents 202, preprocessing input documents 204, content selection from input documents 206, generating test questions from selected content 208, generating distractors 210, selecting test questions for a set of test questions 212, organizing selected test questions in ordered arrangement, and presenting, via a virtual agent, the ordered arrangement of the set of questions in the determined order during a conversation with a user.

The input into the system may include input documents in the form of written text and/or audio transcripts. The input documents may include learning materials used to teach learners. The input documents may cover a wide variety of topics and may each include differing levels of detail depending on teaching goals. The input documents may be in various formats (e.g., MICROSOFT WORD, MICROSOFT POWERPOINT, PDF, etc.).

In some embodiments, during operation 202, the input document may be received by uploading the input document. In some embodiments, the disclosed system and method may include detecting and extracting text from the input document. For example, a content detection and analysis framework, such as APACHE TIKA 2, may be used to detect and extract text from the input document.

Referring back to FIG. 1, test builder 116 may include six main modules that may carry out the disclosed method: a preprocessor 118, a content selector 120, a question generator 122, a distractor generator 124, a question scorer 126, and a question organizer 128. The content selector may decide from which paragraphs/sentences of the original document to generate questions. The question generator module may generate questions. In some embodiment, one or more of the following types of questions may be generated: descriptive, factoid, fill in the blank, Boolean, and true-false. In some embodiments, the question generator module may include multiple question generators. For example, multiple question generators may be specific to the type of question generated. In some embodiments, the question generator module may include a single question generator that can generate multiple types of questions. The question generator(s) may include pre-trained models or templates containing common words and/or phrases used in questions, depending on the question type, and may include slots for words and/or phrases specific to the input documents (e.g., words and/or phrases extracted from input documents using disclosed techniques). The distractor generator may generate distractors (i.e., alternate confusing answers) for factoid and fill in the blank questions, which both include single word and/or single phrase answers. The answer scorer may score answers for description type questions. As part of scoring, the given answers may be compared with the ideal answer and the user may be provided feedback on the closeness to the answer. Answer scoring may be used to assess a user's performance and give feedback in real time. The question organizer may select questions and determine a particular order in which the questions are to be asked. In some embodiments, the question organizer may both select test questions from those generated by question generator and determine the order of the selected test questions based at least partially on answer scoring from the past performance of a user. The question organizer may allow a user (e.g., learner role) to opt for a shuffled assessment in which specific questions are chosen from the overall set and presented to the user based on one or more of question complexity, variety, and previous performance of the user.

Figure 3B:
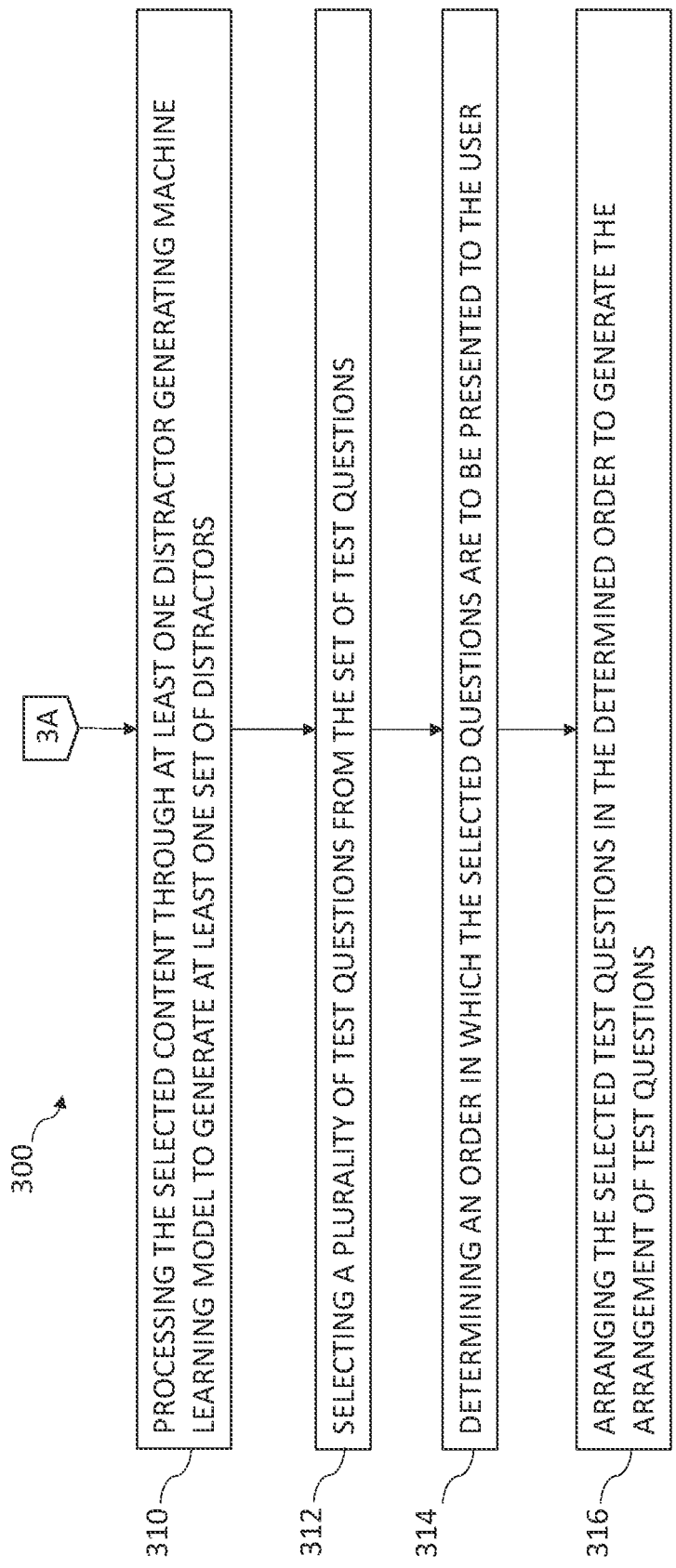

FIGS. 3A and 3B shows a method of generating an arrangement of test questions to ask a user during a conversation with a virtual agent 300 (or method 300), according to an embodiment. As discussed above with respect to FIG. 2, the method may include receiving the input document. For example, method 300 may include receiving an input document (operation 302). For example, a user may upload an input document for the test builder to receive.

As discussed above with respect to FIG. 2, the method may include preprocessing the input document. For example, method 300 may include preprocessing the input document to extract text, parse the extracted text, and detect sections formed within the extracted text (operation 304). This preprocessing may be performed by preprocessor 118 using natural language processing techniques. In some embodiments, preprocessing may include identifying cohesive text blocks from the document. For example, the content of the input document may be partitioned into sections and/or subsections that each form a cohesive unit. In some embodiments, the system may allow a user to upload templates specifying the sections and/or subsections that are to be ignored.

As discussed above with respect to FIG. 2, the method may include content selection from input documents. For example, method 300 may include processing the detected sections through at least one content selection machine learning model to select content from the detected sections (operation 306). More details regarding content selection are discussed below.

As discussed above with respect to FIG. 2, the method may include generating test questions. For example, method 300 may include processing the selected content through at least one test question generating machine learning model to generate a set of test questions (operation 308). More details regarding test generation are discussed below.

As discussed above with respect to FIG. 2, the method may include generating distractors. For example, method 300 may include processing the selected content through at least one distractor generating machine learning model to generate at least one set of distractors corresponding to at least one test question of the plurality of test questions (operation 310). More details regarding distractor generation are discussed below.

As discussed above with respect to FIG. 2, the method may include selecting test questions. For example, method 300 may include selecting a plurality of test questions from the set of test questions (operation 312). More details regarding selecting test questions are discussed below.

As discussed above with respect to FIG. 2, the method may include organizing test questions in an ordered arrangement. For example, method 300 may include determining an order in which the selected questions are to be presented to the user, wherein the order is based on the user's previous history of answering test questions from the set of test questions (operation 314). In another example, method 200 may include arranging the selected test questions in the determined order to generate the arrangement of test questions (operation 316).

More details regarding selecting test questions and organizing test questions in an ordered arrangement are discussed below. For example, as discussed below, selecting a plurality of test questions from the set of test questions may include selecting based on one or more of header topics corresponding to each test question of the set of test questions, the user's previous history of answering test questions from the set of test questions, and the score of each test question in the set of test questions. The user's previous history may include whether or not the user answered individual test questions or the user's past performance (e.g., whether or not the user correctly or incorrectly answered individual test questions at another time). In another example, as discussed below, the test questions may be processed through a test question scoring machine learning model to calculate a score based on one or more of the user's feedback, a keyphrase score indicating a test question's usefulness, a context score based on the number of keyphrases in the test question that come from the selected content, and the number of distractors corresponding to the test question. This test question score may be used when selecting and/or arranging the order of test questions.

Content selection may include one or more of user-marked selection, sentence prioritization, extractive summarizing, abstractive summarizing, and fact detection. User-marked selection may include manually selecting paragraphs/sentences from the original document to use for question generation. Sentence prioritization may include using an extractive summarizing technique. For example, a technique such as TextRank may be used to group similar sentences using a graph based approach and score the most representative sentences. These sentences can be the most useful to generate questions. Abstractive summarizing may include paraphrasing several paragraphs in the input document, which may serve as a concise input to the question generation system. Fact detection may include filtering out the "opinions" from the input document and detecting/selecting the core facts from the input document. Consequently, subjective, or conversational sentences may be removed.

The fact detection may include applying an ensemble of multiple machine learning models. For example, in some embodiments, the ensemble of multiple machine learning models may include a first machine learning model, a second machine learning model, and a third machine learning model. In one scenario, a sentence may be considered an opinion or a subjective sentence if two of the three machine learning models of the ensemble classifies it as such. In some embodiments, the first machine learning model may be trained using Bidirectional Encoder Representations from Transformers (BERT) with Next Sentence Prediction (NSP). For example, the first machine learning model may include techniques discussed in Jacob Devlin, Ming-Wei Chang, Kenton Lee, and Kristina N. Toutanova, 2018b, "BERT: Pre-training of deep bidirectional transformers for language understanding," arXiv:1810.04805v2, which is incorporated by reference in its entirety. In some embodiments, the second machine learning model may be a subjectivity classifier, such as the subjectivity classifier used in TextBlob, Python (2 and 3) library for processing textual data. In some embodiments, the third machine learning model may be trained using a few-shot model, such as Task-Aware Representation of Sentences (TARS), described in Kishaloy Halder, Alan Akbik, Josip Krapac, and Roland Vollgraf. 2020. "Task-aware representation of sentences for generic text classification," in Proceedings of the 28th International Conference on Computational Linguistics, pages 3202-3213, Barcelona, Spain (Online), International Committee on Computational Linguistics, which is incorporated in its entirety. The third machine learning model may be trained based on documents from a dataset generated for this purpose.

In some embodiments, question generation may include keyphrase extraction and glossary extraction. For example, generating the set of test questions may include extracting keyphrases from the selected content, and generating the set of test questions includes extracting glossary terms and definitions corresponding to the glossary terms from the selected content.

Keyphrase extraction may include extracting keyphrases from the input document and then organizing the keyphrases into topics. These keyphrases may be used as input to both the factoid generation module and the distractor generation module. For example, in some embodiments, keyphrase extraction may include running a part of speech (POS) tagger run on the input document and extracting a list of phrases in which a phrase unit is referred to as P and is described as AJ?NN*. Keyphrase extraction may also include organizing the phrases P into topics T based on at least one common word. In some embodiments, keyphrase extraction may additionally or alternatively include organizing phrases P into topics T based on a similarity threshold using FastText, as described in Armand Joulin, Edouard Grave, Piotr Bojanowski, and Tomas Mikolov. 2016, "Bag of tricks for efficient text classification," which is incorporated in its entirety. In some embodiments, keyphrases may be identified within a list of phrases from the input document by identifying which phrases p are title case or are in a trigram, and then adding those phrases p to the list of term Te. In some embodiments, keyphrases may be identified within a list of phrases from the input document by identifying which phrases p are bigrams. Then, the number of examples in the topic that the phrase p belongs to may be counted. If at least 2 examples in the topic, the p is added to a term Te. In some embodiments, any phrase not in title case or not containing a bigram or trigram can be ignored. Once all of the terms are found within the phrases of the input document, a co-occurrence matrix may be built for each occurrence within the same sentence and/or paragraph. The score for each term t in each topic T may be calculated by the following equation:

$$St = (W1*p) + (W2*(cc/CC)) + (W3*(tf/TF)),$$

where p is the presence of term to in a summary or introduction, cc is the co-occurrence count, CC is the max co-occurrence count, tf is the term frequency, TF is the max term frequency, and W1, W2, and W3 are weights such that W1+W2+W3=1.

Questions may be generated by extracting the glossary terms from sentences in the input document. The sentences may be first individually classified as a definition or not a definition by a machine learning model. For example, the machine learning model may be a RoBERTa Model described in Yinhan Liu, Myle Ott, Naman Goyal, Jingfei Du, Mandar Joshi, Danqi Chen, Omer Levy, Mike Lewis, Luke Zettlemoyer, and Veselin Stoyanov. 2019. RoBERTa: "A Robustly Optimized BERT Pretraining Approach." arXiv preprint arXiv:1907.11692, which is incorporated by reference in its entirety. The glossary term (or the definition term) and its meaning (or the definition) may be extracted from the sentences classified as a definition. For example, a BERT Tokenizer and BERT Model may be applied to extract glossary words/terms and corresponding meanings from the classified sentences. See an example of a BERT Tokenizer and BERT Model described in Jacob Devlin, Ming-Wei Chang, Kenton Lee, and Kristina Toutanova, 2018a, "BERT: Pre-training of deep bidirectional transformers for language understanding," arXiv preprint arXiv:1810.04805, which is incorporated by reference in its entirety. Then, the extracted glossary term (or the definition term) and its meaning (or the definition) may be passed to the question generator module to generate a question around the glossary term. For example, a question generator template containing common wording for glossary style questions may be applied to generate a question containing language from the glossary words/terms.

In an exemplary scenario of glossary extraction, the following sentence is included in the input document: "Machine Learning is a technique that helps to achieve AI by enabling systems to learn patterns from data and subsequently improve from experience." This sentence may be classified as a definition and the glossary term (or the definition term) and its meaning (the definition) may be extracted from the same sentence. In such a scenario, the glossary term may be "machine learning" and the definition of machine learning may be "a technique that helps to achieve AI by enabling systems to learn patterns from data and subsequently improve from experience." The question generated around the glossary term "machine learning" may be: "define machine learning." And the answer may be the definition extracted from the sentence. As demonstrated by this scenario, the question may not always be in question form and may instead be a directive to describe or define something. Additionally, questions may be generated that use a glossary term or definition when asking something related to the same. In other words, the generated test question may showcase a glossary term and/or definition without directly asking for one or the other as the answer.

Descriptive questions refer to those questions which require an answer in the form of a sentence or paragraph. Descriptive questions usually begin with "how", "why" or "what". For example, the following is an example of a descriptive question: "what is ether?" Descriptive questions can be generated by using a pre-trained model. An example framework or pre-trained model for the generation of descriptive questions may include the Unified pre-trained Language Model (UniLM v1, described in Li Dong, Nan Yang, Wenhui Wang, Furu Wei, Xiaodong Liu, Yu Wang, Jianfeng Gao, Ming Zhou, and Hsiao-Wuen Hon. 2019. "Unified language model pre-training for natural language understanding and generation." arXiv:1905.03197v3, which is incorporated by reference in its entirety). To generate a question using the pre-trained model, a sentence and answer pair must be specified. Each sentence may be passed to a piece of code, which breaks the sentence into its component clauses that may be used as the answers in the sentence and answer pair. The pair may then be passed to the question generator module (e.g., a pre-trained question generator model of the question generator module) to generate the respective question.

In some embodiments, descriptive questions may include the following: "describe _____ in 500 words or less" or "explain _____ in 1,000 words or less." The blank in these question may be filled with a topic (or title) from the selected content in the input document. To generate such a question, a block of text or passage from the selected content may be processed through a machine learning model to generate a short (e.g., 3-4 word) descriptor (e.g., title). For example, this may be done by creating an attention mask for the passage and then processing the passage and attention mask through a machine learning model (e.g., a transformer machine learning model) to predict a title. Then, the descriptor may be used as the topic in the blank of the sentence.

Factoid questions refer to those questions which require a single word as an answer. Factoid questions often contain "what", "when", "who", and/or "how many" as their constructs. For example, a factoid question may be "what is the cryptocurrency generated by the Ethereum Platform?" Factoid questions may be generated by selecting the most useful noun phrases (e.g., keyphrases) from the text. For example, the above described techniques may be used to extract keyphrases to be used to generate factoid questions. In another example, in some embodiments, factoid questions may be generated by applying the keyphrase extraction technique described in Florian Boudin, "Unsupervised Keyphrase Extraction with Multipartite graphs", arXiv: 1803.08721 v2, which is incorporated by reference in its entirety. The keyphrases generated may be passed to a pre-trained model one by one together with the sentence the keyphrases derive from.

Fill in the Blank questions are those questions where a blank value is inserted in a statement and the answer to the question is a response that can fit best the blank for the statement. For example, a fill in the blank question may be: "_____ is the cryptocurrency generated by the Ethereum platform." Generating a fill in the blank question may include finding the best keyword (e.g., using the keyphrase extraction technique described above) that can be treated as a blank and then using a machine learning technique (e.g., Jacob Devlin, Ming-Wei Chang, Kenton Lee, and Kristina Toutanova, 2019, "BERT: Pre-training of deep bidirectional transformers for language understanding", arXiv: 1810.04805v2) to mask the blank sentence. This masked sentence may then be used to generate the best options out of which correct response is the keyword selected in the beginning for masking the sentence.

Boolean questions are questions which have either "yes" or "no" as their answer. The following is an example of a Boolean question: "Is Ether generated by the Ethereum platform?" In some embodiments, Boolean questions may be generated by applying a model trained using T5 (the Text-to-Text Transfer Transformer Model described in Colin Raffel, Noam Shazeer, Adam Roberts, Katherine Lee, Sharan Narang, Michael Matena, Yanqi Zhou, Wei Li, and Peter J. Liu, 2020, "Exploring the limits of transfer learning with a unified text-to-text transformer", arXiv: 1910.10683v3, which is incorporated by reference in its entirety) on the BoolQ data set (described in Christopher Clark, Kenton Lee, Ming-Wei Chang, 579 Tom Kwiatkowski, Michael Collins, and Kristina Toutanova, 2019, "BoolQ: Exploring the Surprising Difficulty of Natural Yes/No Questions", arXiv:1905.10044v1, which is incorporated by reference in its entirety) for paragraph and question pairs with attention, masking, and pre-trained embeddings.

True-False questions are statements that either state something true or something false. The following is an example of a true-false question: "Butyl is the cryptocurrency generated by the Ethereum platform." True statements may be generated by extracting statements from the input document and either leaving the extracts statements as they are or rephrasing the extracted statements to be slightly different from the original wording. For example, true statements may be generated by paraphrasing sentences from the input document by using a pre-trained model (e.g., pretrained model described in Thomas Wolf, Lysandre Debut, Victor Sanh, Julien Chaumond, Clement Delangue, Anthony Moi, Pierric Cistac, Tim Rault, Rémi Louf, Morgan Funtowicz, Joe Davison, Sam Shleifer, Patrick von Platen, Clara Ma, Yacine Jernite, Julien Plu, Canwen Xu, Teven Le Scao, Sylvain Gugger, Mariama Drame, Quentin Lhoest, and Alexander M. Rush, 2020, "Transformers: State-of-the-art natural language processing", In Proceedings of the 2020 Conference on Empirical Methods in Natural Language Processing: System Demonstrations, pages 38-45, Online, Association for Computational Linguistics, which is incorporated by reference in its entirety.)

False statements may be generated by extracting statements from the input document and modifying the extracted statements a small way to make them false. A number of techniques may be used to generate false statements. In some embodiments, only one technique may be used and in other embodiments multiple techniques may be used. An example of a technique for generating false statements may include inserting negations, such as "not", "no", and "never", or by removing such negations if they are already included in the original extracted statement. In another example, definitions and terms may be extracted from the input document (e.g., see above techniques discussed with respect to glossary extraction) and the definitions may be interchanged with other definitions in the same document. In yet another example, certain clauses of an extracted sentence may be replaced by using a library (e.g. GPT-2 Library described in Alec Radford, Jeffrey Wu, Rewon Child, David Luan, Dario Amodei, and Ilya Sutskever, "Language Models are Unsupervised Multitask Learners," OpenAI, which is incorporated by reference in its entirety).

A distractor is an alternate confusing answer. Such alternate confusing answers may be used in a multiple choice question. For example, factoid and fill in the blank questions may include multiple choice answers where the virtual agent presents the user with multiple options for answers to select from. The correct answer and the distractors may be presented together as options. In some embodiments, distractors may be generated by a statistical model. For example, a statistical model may generate distractors which are aligned with the question and are part of the text used for question generation. The statistical model may be based on the entire corpus from which the question is generated and may group keywords belonging to the same group/topic based on a common word or semantic similarity. When it comes to distractor generation, keywords may be selected from the group of the correct answers to multiple choice questions.

In some embodiments, distractors may be generated by a nearest neighbor model using pre-trained word vectors (e.g., embeddings from Common Crawl, FastText, GloVe, Sense2Vec, Concept Net, etc.) to generate distractors which are aligned with the question but are not close in meaning to the correct answer to the multiple choice question. In some embodiments, one source of pre-trained word vectors is used. In other embodiments, multiple sources of pre-trained word vectors are used in combination.

In some embodiments, distractors may be generated by a hierarchical encoder decoder with static and dynamic attention. The hierarchical encoder decoder may use the corpus of text, question, and its correct answer as input to generate distractors related to the answer and having a semantic meaning similar to that of the question and/or related to the topic of the question. An example of a hierarchical encoder decoder with static and dynamic attention that could be used is described in Guillaume Klein, Yoon Kim, Yuntian Deng, Jean Senellart, and Alexander M Rush, 2017b, "OpenNMT: Open-Source Toolkit for Neural Machine Translation", arXiv preprint arXiv:1701.02810, which is incorporated by reference in its entirety.

The answers submitted by users may be scored using various techniques. For example, the answers may be scored by computing the cosine similarity between the user's answer and the correct answer. In another example, the answers may be scored by using a machine learning model to compute the number of keywords present in the user's answer and the number of keywords present in the correct answer and compare the number of keywords in each. The machine learning model can score the grammar of the answer to predict the actual score of the answer. The machine learning model may use one or a combination of Linear Regression (LR), KNearestNeighbor (KNN), Support Vector Regression (SVR), DecisionTreeRegressor (DTR), and XGBoostRegressor (XGBR). To boost the accuracy of the model, a VotingRegressor (VR) may be used to boost the accuracy of the applied machine learning model(s).

In some embodiments, the disclosed system and method include generating dynamic assessments to ensure that questions are generated equally among various headers, different types of questions are presented, and/or more useful questions are presented. A metric called question score may be used to determine usefulness in some embodiments. This score may be used to select test questions and to arrange the order of test questions.

The question score may be based a combination of factors. For example, the user input may be a factor. In an example scenario, the number of positive feedback instances (e.g., the number of times the user has provided a thumbs up) provided by the user may be the user input considered when calculating the question score.

In some embodiments which a question is a factoid type, a keyphrase score (St) for the question may be used to calculate a question score. For example, a higher keyphrase score may indicate a more useful question.

In some embodiments, a context score may be generated from a summation of the number of the keyphrases in the context C.

In some embodiments in which a question is a factoid type, then the number of distractors generated (dn) is another parameter.

In some embodiments in which the question is a descriptive type, the usefulness may be arranged based on the algorithm used. A score of "3" for questions generated from glossary extraction, "2" for questions from using phrases after sentence breakup, and "1" for questions generated from titles.

A question score may be generated for each category of question by a simple weighted summation.

The user may be allowed to select the maximum number of questions C that are to be assessed. The first step in creating dynamic assessments may be scoring questions of each type and creating a scores q1s, q2s, etc. Then the variety and distribution of questions may be generated.

In some embodiments, the variety and distribution of questions may be generated by the following operations. The list of questions can be represented by Q and the number of questions (or count) can be represented by C. The header topics can be represented as H=h1, h2, h3 . . . hn. The questions types of descriptive, factoid, true-false, Boolean, and fill in the blanks may be represented as qt1, qt2, qt3, qt4, and qt5, respectively. The questions of type q1 that correspond to header h1 can be represented as q1h1, q1h2, q1h3 . . . q1hn. Sets of questions that have been answered correctly by the user in the last two assessments may be represented as QFc. Sets of questions that have been answered incorrectly by the user in the last two assessments may be represented as QFw. Sets of questions that are new or have not yet been asked (for a specific user) may be represented by QFn. If C<H then one question may be chosen from as many headers as possible. Otherwise, at least one question may be chosen from each header, starting with the most useful and omitting questions QF.

In some embodiments, headers may already exist in input documents to label sections of the input document by subject/topic. The headers may be extracted or identified and associated with the section labeled by the header. In some embodiments, arranging the questions may include arranging the questions by the section of the input document the question is generated from. In such a case, the questions may be labeled by the header of the section the questions are generated from. Then, the questions may be arranged according to their header label. For example, in one embodiment, the headers H may be arranged randomly, such that the questions labeled with that header appear in the order of the headers H. The types of questions selected for a set of test questions may be different. Additionally, the types of questions may be selected based on certain distributions. For example, in one embodiment, 20% of the questions may be from qt1, 60% from qt2 and qt3, and 20% from qt4 and qt5. In some embodiments, only one type of question may be selected. For example, the input document may include little information and a certain type of question (e.g., factoids) may be suitable for this condition. In other embodiments, two or more types of questions may be selected. As test questions may be selected by type, test questions may be arranged in an order based on different factors (e.g., status as QFw, QFn, and/or QFc). For example, in one embodiment, QFw questions may be selected first, QFn questions may be selected next, and QFc questions may be selected last.

Once a test is generated, the virtual agent may interact with a user by presenting the user with test questions in the order determined using the various operations discusses above. During a testing session, the virtual agent may conduct a conversation with a user in which the virtual agent receives a user utterance and, in response, presents the user with test questions. For example, the method may include, in response to a user's utterance, presenting to the user, via the virtual assistant, a response including at least one test question from the set of test questions selected and arranged in the manner discussed above. Then, in response to being presented with a test question, the user may answer the test question via the chat/conversation with the virtual assistant and the user's answer may, thus, be received. This pattern of the virtual agent presenting a test question and the user responding with an answer can be repeated. For example, the virtual agent may present a first question, the user may answer the first question, then the virtual agent may present a second question, and the user may answer the second question. This pattern may be repeated for all of the questions in a set of test questions selected and arranged in the order determined by the disclosed techniques. The questions may be presented to the user in the order of arrangement. After answering the question, the virtual agent may give the user feedback by confirming that the user correctly answered the question or by confirming that the user did not correctly answer the question and further presenting the user with the correct answer. In some embodiments, an evaluator may modify which questions are actually presented and the order the questions are actually presented in.

Since the virtual agent is conversational, the user may ask the virtual agent questions during the process of taking a test. For example, the virtual agent may ask the first test question and rather than answering the user may ask for clarification about the first test question before answering or the user may type "next" to skip a test question.

In some embodiments, the chat box displayed on the screen through which the user communicates with the virtual agent may provide a button or other selection mechanism for selecting to have the context of a question be displayed on the screen. For example, a button may be labeled "context." A user (e.g., an evaluator) may select the button and a window may appear showing the portion of the input document that the question comes from. This button may be available to the user depending on the mode the virtual agent is in. For example, if the evaluator is evaluating the test questions, the evaluator may want to check which section of the input document the test question comes from. In another example, the learner may only have the opportunity to select the context button when they have already answered the test question. This may provide a way for the learner to revisit the portion of the input document containing the question and the answer to better absorb the material.

In some embodiments, the virtual agent may provide the user with the ability to select amongst test questions that have the same meaning but different phrasing. For example, a learner may not understand a question as it is phrased and may select different wording. In another example, an evaluator may approve of the meaning of a test question but may want to use alternative phrasing to make the question more readable for the learners. The alternative test questions having the same meaning may be generated using the techniques described above.

In some embodiments, the user may also be presented with multiple choice options to select an answer from when the user is presented with the test question. The multiple choice options may include the correct answer and distractors generated by the operations discussed above. The method may include scoring the user's answer in the manner discussed above. For example, the user's answer may be processed through an answer scoring machine learning model to calculate an answer score based on how close the user's answer is to the correct answer. The method may further include presenting the user with their score to help give the user feedback. The method may also include using the answer score to select and arrange test questions in the future for the same user in the manner discussed above.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of controlling a virtual agent by generating an arrangement of test questions to ask a user during a conversation with the virtual agent, comprising:
   receiving an input document;
   preprocessing the input document to extract text, parse the extracted text, and detect sections formed within the extracted text;
   training a first machine learning model to classify sentences in the input document as either objective or subjective;
   applying the first machine learning model to classify sentences in the input document as either objective or subjective;
   applying a second machine learning model to classify sentences in the input document as either objective or subjective;
   applying a third machine learning model to classify sentences in the input document as either objective or subjective;

processing the detected sections through at least one content selection machine learning model to select content from the detected sections, wherein selecting content includes filtering sentences classified by the at least two of the first, second, and third machine learning models as subjective sentences from the input document;

processing the selected content through at least one test question generating machine learning model to generate a set of test questions;

processing one or both of a first test question of the set of test questions and its corresponding answer through at least one distractor generating machine learning model to generate at least one set of distractors corresponding to the first test question;

selecting a plurality of test questions from the set of test questions;

determining an order in which the selected test questions are to be presented to the user;

arranging the selected test questions in the determined order to generate the arrangement of test questions;

presenting to the user, via the virtual agent, the first test question in the determined order during the conversation with the user;

receiving a user's answer to the at least one test question;

processing the user's answer through a plurality of answer scoring machine learning models to calculate answer scores based on how close the user's answer is to a correct answer; and applying a voting regressor to the plurality of answer scoring machine learning models to generate a final answer score.

2. The method of claim 1, wherein generating the set of test questions includes extracting keyphrases from the selected content, and wherein generating the set of test questions includes extracting glossary terms and definitions corresponding to the glossary terms from the selected content.

3. The method of claim 1, further comprising:
receiving, via the virtual agent and after presenting the first test question, a user question from the user during the conversation with the user; and
in response to the received user question, processing the user question and generating and presenting to the user, via the virtual agent, an answer to the user question.

4. The method of claim 3, wherein processing one or both of the first test question and its corresponding answer through the at least one distractor generating machine learning model to generate at least one set of distractors includes processing a corpus of text, a question, and its corresponding answer as input through a hierarchical encoder decoder with static and dynamic attention, and wherein presenting to the user, via the virtual agent, the first test question includes presenting the correct answer to the first test question with the set of distractors corresponding to the first test question.

5. The method of claim 1, further comprising:
processing the selected test questions through a test question scoring machine learning model to calculate a test question score based on one or more of the user's feedback, a context score based on the number of keyphrases in the test question that come from the selected content, and the number of distractors corresponding to the test question.

6. The method of claim 5, wherein selecting the plurality of test questions from the set of test questions includes selecting based on one or more of header topics corresponding to each test question of the set of test questions, the user's previous history of answering test questions from the set of test questions, and the test question score of each test question in the set of test questions.

7. The method of claim 1, wherein the set of test questions include at least two test questions of different test question types and wherein selecting the plurality of test questions from the set of test questions is also based on the different question types.

8. The method of claim 1, wherein the order is based on the user's previous history of answering test questions from the set of test questions correctly or incorrectly.

9. The method of claim 1, wherein training the first machine learning model includes using Bidirectional Encoder Representations from Transformers (BERT) with Next Sentence Prediction (NSP).

10. The method of claim 1, further comprising:
in response to multiple utterances of the user, presenting, via the virtual agent, multiple responses each corresponding to individual utterances of the multiple utterances, wherein the multiple responses include one or more of the selected test questions in the order determined.

11. The method of claim 10, wherein the second machine learning model is a subjectivity classifier provided by a library, and wherein the third machine learning model applies Task-Aware Representation of Sentences (TARS).

12. A system for controlling a virtual agent by generating an arrangement of test questions to ask a user during a conversation with the virtual agent, comprising:
one or more computers and one or more storage devices storing instructions that are operable, when executed by the one or more computers, to cause the one or more computers to:
receive an input document;
preprocess the input document to extract text, parse the extracted text, and detect sections formed within the extracted text;
train a first machine learning model to classify sentences in the input document as either objective or subjective;
apply the first machine learning model to classify sentences in the input document as either objective or subjective;
apply a second machine learning model to classify sentences in the input document as either objective or subjective;
apply a third machine learning model to classify sentences in the input document as either objective or subjective;
process the detected sections through at least one content selection machine learning model to select content from the detected sections, wherein selecting content includes filtering sentences classified by the at least two of the first, second, and third machine learning models as subjective sentences from the input document;
process the selected content through at least one test question generating machine learning model to generate a set of test questions;
process one or both of a first test question of the set of test questions and its corresponding answer through at least one distractor generating machine learning model to generate at least one set of distractors corresponding to the first test question;
select a plurality of test questions from the set of test questions;

determine an order in which the selected test questions are to be presented to the user;

arrange the selected test questions in the determined order to generate the arrangement of test questions; and present to the user, via the virtual agent, the first test question in the determined order during the conversation with the user;

receive a user's answer to the at least one test question;

process the user's answer through a plurality of answer scoring machine learning models to calculate answer scores based on how close the user's answer is to a correct answer; and apply a voting regressor to the plurality of answer scoring machine learning models to generate a final answer score.

13. The system of claim 12, wherein generating the set of test questions includes extracting keyphrases from the selected content, and wherein generating the set of test questions includes extracting glossary terms and definitions corresponding to the glossary terms from the selected content.

14. The system of claim 12, further comprising:

receiving, via the virtual agent and after presenting the first test question, a user question from the user during the conversation with the user; and in response to the received user question, processing the user question and generating and presenting to the user, via the virtual agent, an answer to the user question.

15. The system of claim 14, wherein presenting to the user, via a virtual agent, the first test question in the determined order during the conversation with the user includes presenting the correct answer to the first test question with the set of distractors corresponding to the first test question.

16. The system of claim 12, further comprising:

wherein training the first machine learning model includes using Bidirectional Encoder Representations from Transformers (BERT) with Next Sentence Prediction (NSP);

wherein the second machine learning model is a subjectivity classifier provided by a library; and wherein the third machine learning model applies Task-Aware Representation of Sentences (TARS).

17. A non-transitory computer-readable medium storing software comprising instructions executable by one or more computers which, upon such execution, cause the one or more computers to control a virtual agent by generating an arrangement of test questions to ask a user during a conversation with a-the virtual agent by:

receiving an input document;

preprocessing the input document to extract text, parse the extracted text, and detect sections formed within the extracted text;

training a first machine learning model to classify sentences in the input document as either objective or subjective;

applying the first machine learning model to classify sentences in the input document as either objective or subjective;

applying a second machine learning model to classify sentences in the input document as either objective or subjective;

applying a third machine learning model to classify sentences in the input document as either objective or subjective;

processing the detected sections through at least one content selection machine learning model to select content from the detected sections, wherein selecting content includes filtering sentences classified by the at least two of the first, second, and third machine learning models as subjective sentences from the input document;

processing the selected content through at least one test question generating machine learning model to generate a set of test questions;

processing one or both of a first test question of the set of test questions and its corresponding answer through at least one distractor generating machine learning model to generate at least one set of distractors corresponding to the first test question;

selecting a plurality of test questions from the set of test questions;

determining an order in which the selected test questions are to be presented to the user;

arranging the selected test questions in the determined order to generate the arrangement of test questions; and presenting to the user, via the virtual agent, the first test question in the determined order during the conversation with the user;

receiving a user's answer to the at least one test question;

processing the user's answer through a plurality of answer scoring machine learning models to calculate answer scores based on how close the user's answer is to a correct answer; and applying a voting regressor to the plurality of answer scoring machine learning models to generate a final answer score.

18. The non-transitory computer-readable medium of claim 17, wherein the order is based on the user's previous history of answering test questions from the set of test questions correctly or incorrectly.

19. The non-transitory computer-readable medium of claim 17, wherein causing the one or more computers to control a virtual agent by generating an arrangement of test questions to ask a user during a conversation with a virtual agent further includes:

in response to multiple utterances of the user, presenting, via the virtual agent, multiple responses each corresponding to individual utterances of the multiple utterances, wherein the multiple responses include one or more of the selected test questions in the order determined.

* * * * *